(12) United States Patent
Shimazaki et al.

(10) Patent No.: US 9,696,168 B2
(45) Date of Patent: Jul. 4, 2017

(54) TRAVEL TIME INFORMATION PROVIDING APPARATUS AND TRAVEL TIME INFORMATION PROVIDING METHOD (71) Applicant: TOYOTA JIDOSHA KABUSHIKI KAISHA, Toyota-shi, Aichi (JP)

(72) Inventors: Keiko Shimazaki, Tokyo (JP); Akira Yoshioka, Tokyo (JP); Masahiro Kuwahara, Tokyo (JP); Takayuki Kusajima, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 14/648,530

(22) PCT Filed: Nov. 21, 2013

(86) PCT No.: PCT/JP2013/006846
§ 371 (c)(1),
(2) Date: May 29, 2015

(87) PCT Pub. No.: WO2014/103149
PCT Pub. Date: Jul. 3, 2014

(65) Prior Publication Data
US 2015/0308844 A1 Oct. 29, 2015

(30) Foreign Application Priority Data

Dec. 27, 2012 (JP) ................................. 2012-284592

(51) Int. Cl.
*G01C 21/34* (2006.01)
(52) U.S. Cl.
CPC ..... *G01C 21/3423* (2013.01); *G01C 21/3492* (2013.01)

(58) Field of Classification Search
CPC ..................... G01C 21/3492; G01C 21/3423
(Continued)

(56) References Cited

U.S. PATENT DOCUMENTS

2005/0093720 A1  5/2005  Yamane et al.
2008/0140308 A1* 6/2008  Yamane ............ G01C 21/3492
                                                             701/423
(Continued)

FOREIGN PATENT DOCUMENTS

JP  2005-122461 A  5/2005
JP  2006-193020 A  7/2006
(Continued)

*Primary Examiner* — Nga X Nguyen
(74) *Attorney, Agent, or Firm* — Oliff PLC (57) ABSTRACT

A travel time information providing apparatus includes a probability distribution storage unit configured to store first probability distribution data which expresses an embarkation waiting time for each location where the waiting time occurs and second probability distribution data which expresses a travel time for each location where the travel time occurs; a route acquiring unit configured to acquire a route connecting a point of origin and a destination; a travel time calculating unit configured to calculate a probability distribution of a total travel time by convoluting all probability distribution data corresponding to an embarkation waiting time which occurs on the route and a travel time which occurs on the route; and an information providing unit configured to determine an estimated travel time based on the calculated probability distribution, and output the estimated travel time.

6 Claims, 8 Drawing Sheets (58) Field of Classification Search
USPC .......................................... 701/465–467, 414
See application file for complete search history.

(56) References Cited

U.S. PATENT DOCUMENTS

2011/0112753 A1    5/2011   Yamane et al.
2012/0004840 A1*   1/2012   Lee .................... G01C 21/3423
                                                           701/465

FOREIGN PATENT DOCUMENTS

JP          2012-058157 A      3/2012
JP          2012-141145 A      7/2012

* cited by examiner

FIG.3

WAITING TIME FREQUENCY DISTRIBUTION

| POINT OF ORIGIN | DESTINATION | TIME SLOT | WAITING TIME | FREQUENCY |
|---|---|---|---|---|
| NODE A | NODE B | 8:00~9:00 | 0 | 0 |
| NODE A | NODE B | 8:00~9:00 | 1 | 4 |
| NODE A | NODE B | 8:00~9:00 | 2 | 3 |
| NODE A | NODE B | 8:00~9:00 | 3 | 8 |
| NODE A | NODE B | 8:00~9:00 | 4 | 12 |
| NODE A | NODE B | 8:00~9:00 | 5 | 16 |
| NODE A | NODE B | 8:00~9:00 | 6 | 20 |
| NODE A | NODE B | 8:00~9:00 | 7 | 24 |
| NODE A | NODE B | 8:00~9:00 | 8 | 22 |
| NODE A | NODE B | 8:00~9:00 | 9 | 20 |
| NODE A | NODE B | 8:00~9:00 | 10 | 24 |
| NODE A | NODE B | 8:00~9:00 | 11 | 32 |
| NODE A | NODE B | 8:00~9:00 | 12 | 28 |
| NODE A | NODE B | 8:00~9:00 | 13 | 24 |
| NODE A | NODE B | 8:00~9:00 | 14 | 20 |
| NODE A | NODE B | 8:00~9:00 | 15 | 16 |
| NODE A | NODE B | 8:00~9:00 | 16 | 8 |
| NODE A | NODE B | 8:00~9:00 | 17 | 6 |
| NODE A | NODE B | 8:00~9:00 | 18 | 4 |
| NODE A | NODE B | 8:00~9:00 | 19 | 2 |
| NODE A | NODE B | 8:00~9:00 | 20 | 1 |
| NODE A | NODE B | 8:00~9:00 | 21 | 0 |
| ... | ... | ... | ... | ... |

FIG.4A

TRAVEL TIME FREQUENCY DISTRIBUTION

| POINT OF ORIGIN | DESTINATION | TIME SLOT | WAITING TIME | FREQUENCY |
|---|---|---|---|---|
| NODE A | NODE B | 8:00~9:00 | 20 | 0 |
| NODE A | NODE B | 8:00~9:00 | 21 | 1 |
| NODE A | NODE B | 8:00~9:00 | 22 | 1 |
| NODE A | NODE B | 8:00~9:00 | 23 | 1 |
| NODE A | NODE B | 8:00~9:00 | 24 | 1 |
| NODE A | NODE B | 8:00~9:00 | 25 | 5 |
| NODE A | NODE B | 8:00~9:00 | 26 | 12 |
| NODE A | NODE B | 8:00~9:00 | 27 | 18 |
| NODE A | NODE B | 8:00~9:00 | 28 | 20 |
| NODE A | NODE B | 8:00~9:00 | 29 | 25 |
| NODE A | NODE B | 8:00~9:00 | 30 | 29 |
| NODE A | NODE B | 8:00~9:00 | 31 | 28 |
| NODE A | NODE B | 8:00~9:00 | 32 | 24 |
| NODE A | NODE B | 8:00~9:00 | 33 | 17 |
| NODE A | NODE B | 8:00~9:00 | 15 | 8 |
| NODE A | NODE B | 8:00~9:00 | 16 | 5 |
| NODE A | NODE B | 8:00~9:00 | 17 | 2 |
| NODE A | NODE B | 8:00~9:00 | 18 | 1 |
| NODE A | NODE B | 8:00~9:00 | 19 | 0 |
| NODE A | NODE B | 8:00~9:00 | 20 | 0 |
| ... | ... | ... | ... | ... |

FIG.4B

```
ROUTE SEARCH RESULT

[POINT OF ORIGIN] SHINJUKU STATION
[DESTINATION] SHIBUYA STATION
[SPECIFIED DEPARTURE TIME] 8:15

[ARRIVAL TIME INFORMATION]
ESTIMATED ARRIVAL TIME: 8:34 TO 8:43
AVERAGE ARRIVAL TIME: 8:39

[PROBABILITY OF ARRIVAL BY DISPLAYED TIME]
8:34  25%
8:39  50%
8:43  75%
8:47  90%
```

FIG.6A

```
ROUTE SEARCH RESULT

[POINT OF ORIGIN] SHINJUKU STATION
[DESTINATION] SHIBUYA STATION
[SPECIFIED DEPARTURE TIME] 8:15

[ARRIVAL TIME INFORMATION]
ESTIMATED ARRIVAL TIME: 8:34 TO 8:43
AVERAGE ARRIVAL TIME: 8:39
SCORE OF ROUTE: 7.35
```

DEPARTURE TIME FREQUENCY DISTRIBUTION

| POINT OF ORIGIN | DESTINATION | SCHEDULED DEPARTURE TIME | ACTUAL DEPARTURE TIME | FREQUENCY |
|---|---|---|---|---|
| NODE A | NODE B | 8:22:00 | 8:22:00 | 8 |
| NODE A | NODE B | 8:22:00 | 8:23:00 | 2 |
| NODE A | NODE B | 8:22:00 | 8:24:00 | 1 |
| NODE A | NODE B | 8:22:00 | 8:25:00 | 1 |
| NODE A | NODE B | 8:27:00 | 8:27:00 | 4 |
| NODE A | NODE B | 8:27:00 | 8:28:00 | 5 |
| NODE A | NODE B | 8:27:00 | 8:29:00 | 3 |
| NODE A | NODE B | 8:27:00 | 8:30:00 | 1 |
| ... | ... | ... | ... | ... |

FIG.8A

WAITING TIME FREQUENCY DISTRIBUTION

| POINT OF ORIGIN | DESTINATION | STATION ARRIVAL TIME | WAITING TIME | FREQUENCY |
|---|---|---|---|---|
| NODE A | NODE B | 8:22:00 | 0:00:00 | 8 |
| NODE A | NODE B | 8:22:00 | 0:01:00 | 2 |
| NODE A | NODE B | 8:22:00 | 0:02:00 | 1 |
| NODE A | NODE B | 8:22:00 | 0:03:00 | 1 |
| NODE A | NODE B | 8:23:00 | 0:00:00 | 2 |
| NODE A | NODE B | 8:23:00 | 0:01:00 | 1 |
| NODE A | NODE B | 8:23:00 | 0:02:00 | 1 |
| NODE A | NODE B | 8:23:00 | 0:04:00 | 4 |
| NODE A | NODE B | 8:23:00 | 0:05:00 | 5 |
| NODE A | NODE B | 8:23:00 | 0:06:00 | 3 |
| NODE A | NODE B | 8:23:00 | 0:07:00 | 1 |
| NODE A | NODE B | 8:24:00 | 0:00:00 | 1 |
| NODE A | NODE B | 8:24:00 | 0:01:00 | 1 |
| NODE A | NODE B | 8:24:00 | 0:03:00 | 4 |
| NODE A | NODE B | 8:24:00 | 0:04:00 | 5 |
| NODE A | NODE B | 8:24:00 | 0:05:00 | 3 |
| NODE A | NODE B | 8:24:00 | 0:06:00 | 1 |
| ... | ... | ... | ... | ... |

FIG.8B

TRAVEL TIME INFORMATION PROVIDING APPARATUS AND TRAVEL TIME INFORMATION PROVIDING METHOD

TECHNICAL FIELD

The present invention relates to a method of calculating a travel time when traveling in use of transportation means.

BACKGROUND ART

A large number of techniques for searching routes in a transportation network which can be traveled using a plurality of transportation means have been proposed. For example, Patent Literature 1 describes a route searching apparatus capable of searching a route that minimizes total travel cost when combining a plurality of transportation means.

The route searching apparatus described in Patent Literature 1 is further capable of searching a route on which a user can travel under a time condition specified by the user. For example, by acquiring a desired departure time or a desired arrival time from a user and referencing an operation schedule of transportation means, a route that enables arrival at a desired time can be searched.

CITATION LIST

Patent Literature

PTL 1: Japanese Patent Application Laid-open No. 2012-58157

SUMMARY OF INVENTION

A route searching apparatus such as that described above references an operation schedule of transportation means stored in advance to calculate a time necessary for travel (hereinafter, a travel time) and presents the travel time to a user. However, when an operation schedule is not set for the transportation means to be used or when the transportation means to be used is not operated according to an operation schedule, since definite time information cannot be obtained, a travel time cannot be accurately calculated.

For example there are cases observed mainly in developing countries where the operation of transportation means is managed according to frequency instead of a schedule. An example is when "20 trains, buses, or the like are to be in service per hour from 8:00 AM to 10:00 AM". As shown, with transportation means for which an operation schedule does not exist, an accurate travel time cannot be calculated using the system described above. While it is possible to calculate a travel time by postulating operation intervals and predicting a waiting time until the transportation means can be embarked on, reliability of the calculated travel time is not high. This is because although the number of operations of the transportation means is guaranteed, the operation intervals of the transportation means are not necessarily guaranteed.

In addition, this problem may also arise with transportation means for which an operation schedule is set. For example, in a case where an operation time deviates significantly from the schedule such as a fixed-route bus that passes a railroad crossing during rush hour, since the reliability of the operation schedule declines significantly, an accurate travel time cannot be calculated.

The present invention has been made in consideration of the problems described above, and an object thereof is to provide a travel time information providing apparatus capable of providing highly credible travel time information.

The present invention in its one aspect provides a travel time information providing apparatus that provides a user with information regarding a travel time in a transportation network which is constituted by nodes and links and in which travel by train or bus is enabled, the travel time information providing apparatus comprising: a probability distribution storage unit configured to store first probability distribution data which expresses an embarkation waiting time that is a time from when a user arrives at any of the nodes constituting the transportation network until when the user embarks on a train or bus to depart from the node for each location where the waiting time occurs and second probability distribution data which expresses a travel time that is a time necessary for the user to travel in any of the links constituting the transportation network for each location where the travel time occurs; a route acquiring unit configured to acquire a route connecting a point of origin and a destination; a travel time calculating unit configured to calculate a probability distribution of a total travel time by acquiring all first probability distribution data corresponding to an embarkation waiting time which occurs on the route and second probability distribution data corresponding to a travel time which occurs on the route, and convoluting the acquired probability distribution data; and an information providing unit configured to determine an estimated travel time based on the calculated probability distribution of the total travel time, and output the estimated travel time.

An embarkation waiting time refers to the time between the arrival of a user at a given node and the start of travel by the user upon arrival of a vehicle (a train or a bus) at the node. For example, when the node is a station, the embarkation waiting time is a time between the arrival of the user at the station and departure of a desired train from the station. When the user disembarks midway to transfer to another train or the like, an embarkation waiting time occurs every time a transfer is made. In this case, the embarkation waiting time is the time between the arrival of a train that is a transfer source and the departure of a train that is a transfer destination.

In addition, a travel time refers to the time necessary by a user to travel a link that connects nodes. For example, when there is a train servicing the link, the travel time is the time between departure of the train from a departure node and arrival of the train at the arrival node.

Since an embarkation waiting time and a travel time vary depending on an operation status of the railroad or buses, values thereof cannot be specified. In consideration thereof, with the travel time information providing apparatus according to the present invention, an embarkation waiting time and a travel time are stored as data expressed by a probability distribution. For example, a probability distribution can be generated based on measured values and stored. A probability distribution can be stored in any format as long as a time and a probability corresponding to the time can be obtained. For example, a probability distribution may be a distribution of past measured values may be expressed by a histogram.

In addition, a travel time calculating unit is unit for generating a probability distribution of a total travel time on a route from a point of origin node to a destination node. By convoluting all probability distributions of embarkation waiting times that occurring at an embarking station or a transfer station and travel times occurring on each link in a route, a probability distribution of a total travel time can be obtained.

An information providing unit is unit for determining an estimated travel time to be presented by a user based on a probability distribution of a total travel time. An estimated travel time may be determined by any method as long as the estimated travel time is obtained from the probability distribution of a total travel time. For example, a time which enables arrival at a probability of 75% may be set as the estimated travel time. In addition, an estimated travel time may be a specific time or a range.

In addition, the information providing unit may generate information representing a variation of the probability distribution of the total travel time and outputs the information together with the estimated travel time.

An estimated travel time may be outputted together with information representing a degree of variation of the probability distribution of a total travel time. A probability distribution with a high degree of variation or, in other words, a probability distribution that is dispersed over a wide range means that the reliability of the calculated estimated travel time is low. Therefore, outputting the estimated travel time together with such information enables the reliability of the estimated travel time to be presented to the user.

In addition, the information providing unit may output a probability of arriving at the destination within the estimated travel time together with the estimated travel time.

For example, information such as "the probability of arriving at the destination within 14 minutes is 75%" or "the estimated arrival time at the destination is 12 to 16 minutes (80% probability)" can be presented to the user. Accordingly, the user can predict an actual arrival time to a certain degree.

In addition, the information providing unit may extract a median value or a mode value from the probability distribution of the total travel time and outputs the median value or the mode value as an estimated travel time.

Favorably, the estimated travel time is a median value or a mode value of a probability distribution. Accordingly, a highly accurate estimated travel time can be presented to the user.

In addition, the route acquiring unit may search for routes connecting a point of origin and a destination and acquires a plurality of route candidates, the travel time calculating unit may generate a probability distribution of a total travel time for each of the acquired route candidates, and the information providing unit may determine an estimated travel time for each of the acquired route candidates and outputs the estimated travel time together with information related to routes.

When there are a plurality of routes from a point of origin to a destination, favorably, a probability distribution of a total travel time is generated for each route and a plurality of estimated travel times are outputted. Accordingly, each user can select a most favorable route according to individual circumstances. For example, a selection of whether to use a route having a certain probability of earliest arrival or a route with a highest reliability of an estimated travel time can be made.

In addition, the information providing unit may calculate, based on a probability distribution of a total travel time for each route, evaluation values on the routes, and output information regarding the routes in a descending order of the evaluation values.

In addition, the evaluation value may be higher when the estimated travel time is short rather than long, and may be higher when a variation of the probability distribution of the total travel time is small rather than large.

The information providing unit may be configured to calculate evaluation values with respect to routes and present routes in a descending order of evaluation values. For example, a route which has a smallest variation in arrival times and which enables earliest arrival may be given a highest evaluation value. Accordingly, when there are a plurality of routes connecting a point of origin and a destination, a more desirable route can be presented to the user.

In addition, a probability distribution of an embarkation waiting time at each node, which is stored by the probability distribution storage unit, may be a probability distribution of a time from when a user arrives at the node at a random time until when the user departs from the node.

An embarkation waiting time that occurs at a node may or may not be dependent on a time at which a user had arrived at the node. For example, when a train departs only after a connection with another train is made, the embarkation waiting time is dependent on the time at which the user had arrived at the node. When the user walks to a station and waits for a train, the embarkation waiting time is not dependent on the time at which the user had arrived at the node. A probability distribution of embarkation waiting time may correspond to either case. Alternatively, both cases may be stored and used selectively.

The present invention can be specified as a travel time information providing apparatus which includes at least a part of the means described above. The present invention can also be specified as travel time information providing method and a travel time information providing program which include at least a part of the processes described above. The processes and the means described above can be freely combined and implemented as long as no technical contradictions arise.

According to the present invention, a travel time information providing apparatus capable of providing highly credible travel time information can be provided.

Further features of the present invention will become apparent from the following description of exemplary embodiments with reference to the attached drawings.

DESCRIPTION OF EMBODIMENTS (Embodiments of Present Invention)
<Computation of Travel Time by Probability Distribution>

Figure 1A:
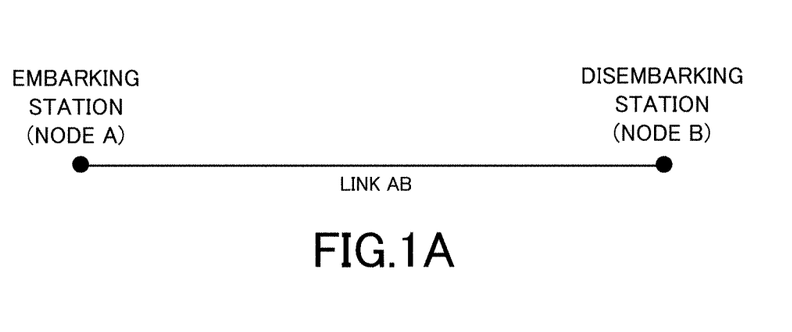
FIG. 1A and FIG. 1B are diagrams showing a relationship between nodes and links according to an embodiment of the present invention.
Figure 1B:
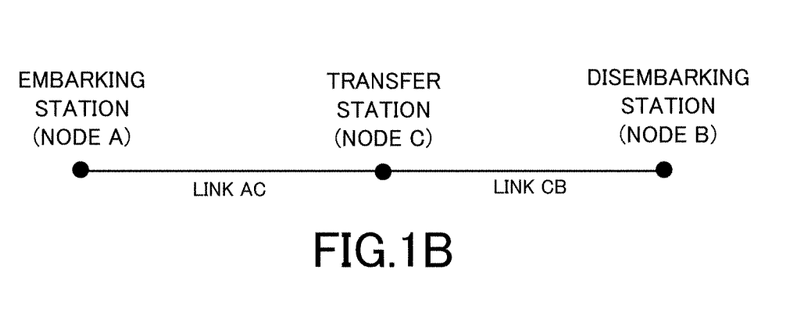

First, a method of computing a travel time using a probability distribution will be described. FIG. 1 is a diagram showing an example of node arrangements and travel routes (links) between the nodes. A node is a transportation hub. In the present embodiment, nodes represent train stations.

First, an example (FIG. 1A) of traveling from node A that is an embarking station to node B that is a disembarking station will be described. Let us assume that an operation schedule does not exist for trains servicing link AB and only an operation frequency (the number of trains that are operated in a unit time) is set.

Information necessary for calculating a travel time from node A to node B is a time during which a user waits for a train at node A (an embarkation waiting time according to the present invention: hereinafter, a waiting time) and a necessary travel time (a travel time according to the present invention: hereinafter, a travel time) of link AB. In the present embodiment, both the waiting time and the travel time are stored in the form of a probability distribution.

Figure 2:
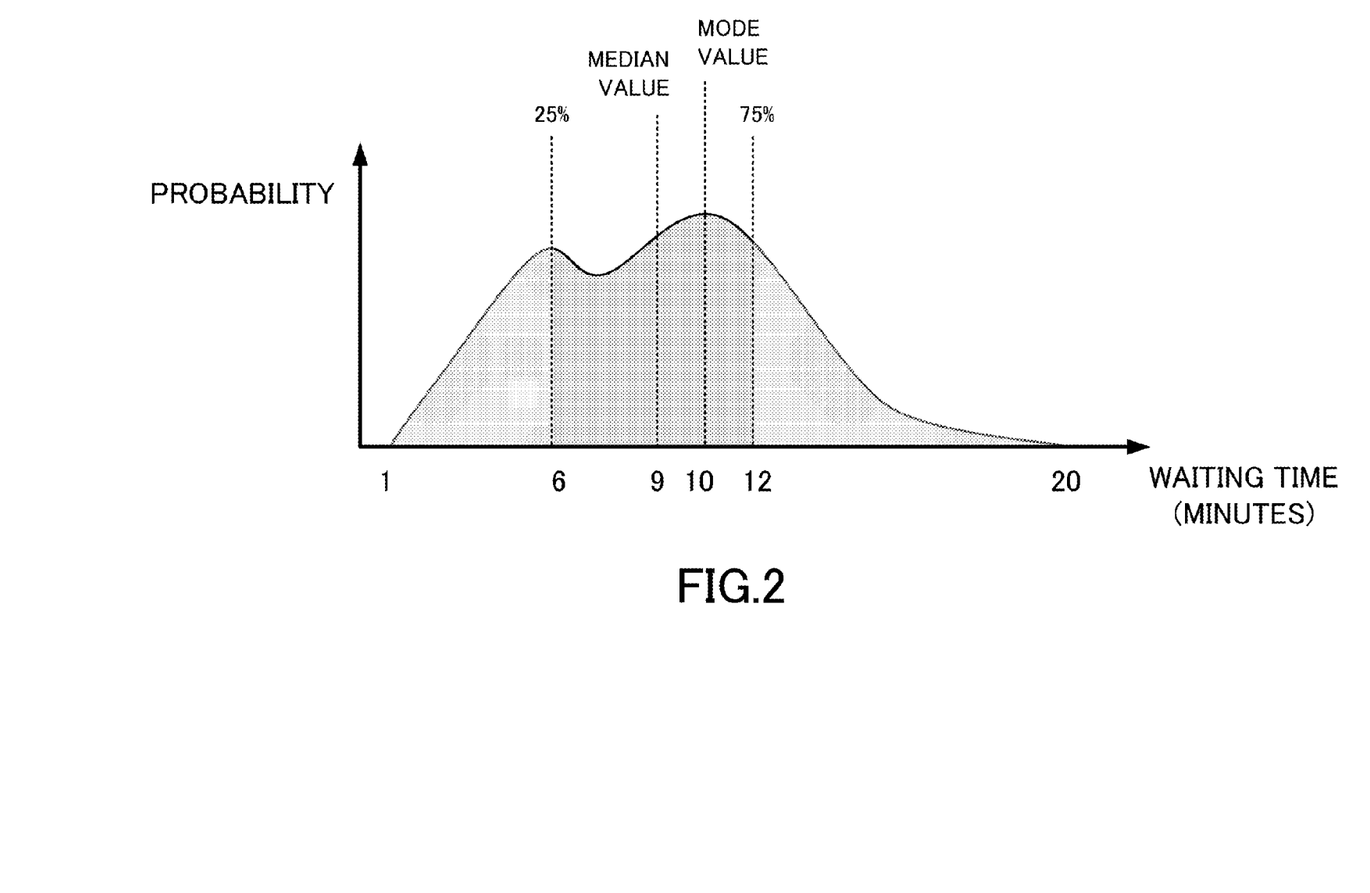
FIG. 2 is a diagram for describing a probability distribution of a waiting time.

FIG. 2 shows an example of a graph representation of a probability distribution of a waiting time. In the example shown in FIG. 2, waiting times are dispersed between 1 to 20 minutes. A mode value is 10 minutes and a median value is 9 minutes. In addition, a 25 percentile value is 6 minutes and a 75 percentile value is 12 minutes. In this case, a percentile value is a value indicating a percentage of an integration value of an integration from a lower limit to a target value among an integration of a whole. A 75 percentile value of 12 minutes indicates that a probability of a train being embarked on within 12 minutes after arriving at a station is 75%. A 75 percentile value of 12 minutes also indicates that a probability of a train being embarked on after a waiting time of 6 to 12 minutes is 50%.

While FIG. 2 shows a waiting time probability distribution, a travel time can be similarly expressed by a probability distribution. In this case, it is assumed that a waiting time at node A and a travel time of link AB are prepared as probability distributions. Let $f_A(t)$ denote the probability distribution of the waiting time at node A and $g_{AB}(t)$ denote a probability distribution of the travel time of link AB.

At this point, if a probability distribution of the travel time from node A to node B is denoted by $h_1(t)$, since $h_1(t)$ is a convolution integral of $f_A(t)$ and $g_{AB}(t)$, $h_1(t)$ can be represented by Expression 1.

[Math.1]

$$h_1(t)=(f_A*g_{AB})(t)=\int_0^\infty f_A(\tau_0)g_{AB}(t-\tau_0)d\tau_0 \quad \text{(Expression 1)}$$

The example described above represents a case where a waiting time and a travel time each occurs once between the point of origin and the destination.

Next, an example in which a waiting time and a travel time each occurs twice between the point of origin and the destination will be described. In this example, a pattern (FIG. 1B) of traveling from node A that is an embarking station to node B that is a disembarking station via node C that is a transfer station will be shown.

In this case, let $f_C(t)$ denote a probability distribution of a waiting time at node C, $g_{AC}(t)$ denote a probability distribution of a travel time of link AC, and $g_{CB}(t)$ denote a probability distribution of a travel time of link CB. Since a probability distribution $h_2(t)$ of a total travel time is a convolution integral of $f_A(t)$, $g_{AC}(t)$, $f_C(t)$, and $g_{CB}(t)$, $h_2(t)$ can be represented by Expression 2.

[Math.2]

$$h_2(t)=(f_A*g_{AC}*f_C*g_{CB})(t)=\int_0^\infty g_{CB}(t-\tau_2)\int_0^\infty f_C(\tau_2-\tau_1) \int_0^\infty f_A(\tau_0)g_{AC}(\tau_1-\tau_0)d\tau_0 d\tau_1 d\tau_2 \quad \text{(Expression 2)}$$

As shown, when a waiting time or a travel time occurs a plurality of times between the point of origin and the destination, by convoluting a probability distribution of the waiting time or the travel time for each location where the waiting time or the travel time occurs, a probability distribution of a total travel time can be obtained.

<System Configuration>

Figure 3:
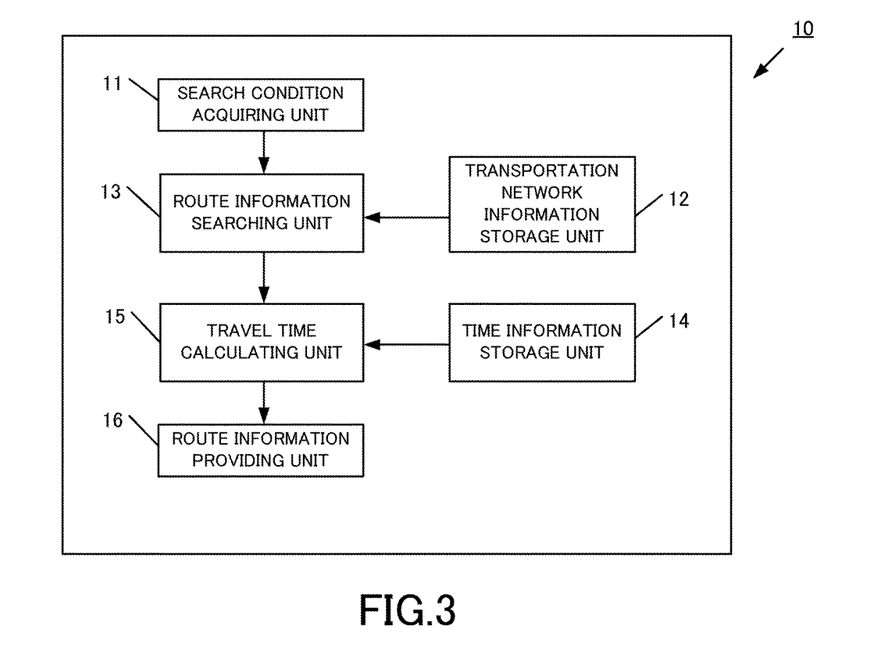
FIG. 3 is a configuration diagram of a route information providing apparatus according to an embodiment of the present invention.

A functional module configuration of a route information providing apparatus which computes a probability distribution of a total travel time according to the calculation method shown above and presents the probability distribution to a user will now be described with reference to FIG. 3. A route information providing apparatus 10 according to an embodiment of the present invention is a computer which stores a transportation network that is an object and which extracts route candidates and outputs travel time information corresponding to an extracted route when a point of origin and a destination are specified. The route information providing apparatus 10 stores all probability distributions of waiting times occurring at nodes and travel times occurring on links which constitute the transportation network, and generates travel time information using the probability distributions.

The route information providing apparatus 10 includes a CPU, a main storage device, and an auxiliary storage device. When a program stored in the auxiliary storage device is loaded onto the main storage device and executed by the CPU, the respective means shown in FIG. 3 are activated (the CPU, the main storage device, and the auxiliary storage device are not shown). In addition, the route information providing apparatus 10 is capable of accepting input from a user and presenting information to the user through an input/output device (not shown) such as a keyboard, a mouse, a touch panel, or a display. Moreover, the route information providing apparatus 10 may be a single computer or a combination of a plurality of computers.

A search condition acquiring unit 11 is a module which acquires a condition that applies when performing a route search (hereinafter, a route searching condition) from a user. Specifically, a route searching condition is information representing a point of origin node and a destination node and may further include a desired departure time, a desired arrival time, and the like. In addition, the route searching condition may include other conditions such as specification of a preferentially used route.

A transportation network information storage unit 12 is a unit for storing information on a target transportation network (hereinafter, transportation network information). Transportation network information is information that includes a relationship among nodes and links representing a target transportation network. In addition, a cost incurred when a user travels between nodes may be defined in transportation network information. If no costs are defined, routes which are preferably excluded such as an apparently circuitous route cannot be distinguished in advance. Therefore, some kind of indicator is favorably defined. Examples of costs include fare, distance, and average travel time. However, a travel time is obtained using information stored in a time information storage unit 14 (to be described later). Costs defined in transportation network information are simply information that serves as guides when searching for a route.

A route information searching unit 13 is a module which extracts a route candidate based on the transportation network information stored in the transportation network information storage unit 12 and the route searching condition acquired from a user. When a cost is stored in transportation network information, favorably, a plurality of route candidates are extracted in a descending order of suitability by referring to the cost. In addition, when a cost is not stored in transportation network information, a plurality of route candidates may be extracted in an ascending order of the number of via links. Since a route searching operation performed by the route information searching unit 13 uses known techniques, a detailed description thereof will be omitted.

A time information storage unit 14 is a unit for storing a probability distribution of a waiting time that occurs when a user embarks on transportation means at a node and a probability distribution of a travel time that occurs when a user travels a link. For example, when calculating a travel time from node A to node B on the transportation network shown in FIG. 1A, a probability distribution of a waiting time at node A and a probability distribution of a travel time of link AB may be stored. In addition, when calculating a travel time from node A to node B on the transportation network shown in FIG. 1B, probability distributions of waiting times at nodes A and C and probability distributions of travel times of links AC and CB may be stored.

In this manner, the time information storage unit 14 respectively stores probability distributions of waiting times or travel times for all nodes and links which a user can pass through on a target transportation network. A probability distribution of a waiting time stored in the time information storage unit 14 corresponds to first probability distribution data according to the present invention, and a probability distribution of a travel time stored in the time information storage unit 14 corresponds to second probability distribution data according to the present invention.

Moreover, while stations are considered nodes and a waiting time is defined for each node in the present embodiment, when there are a plurality of train lines departing from a given station or when trains departing from the station have a plurality of destinations, a node may be defined for each train line or destination and a node corresponding to a route may be used.

In a similar manner, while routes connecting stations are considered to be links in the present embodiment, when a plurality of train lines are in service between given stations, a link may be defined for each train line and a link corresponding to a route may be used.

Figure 4A:
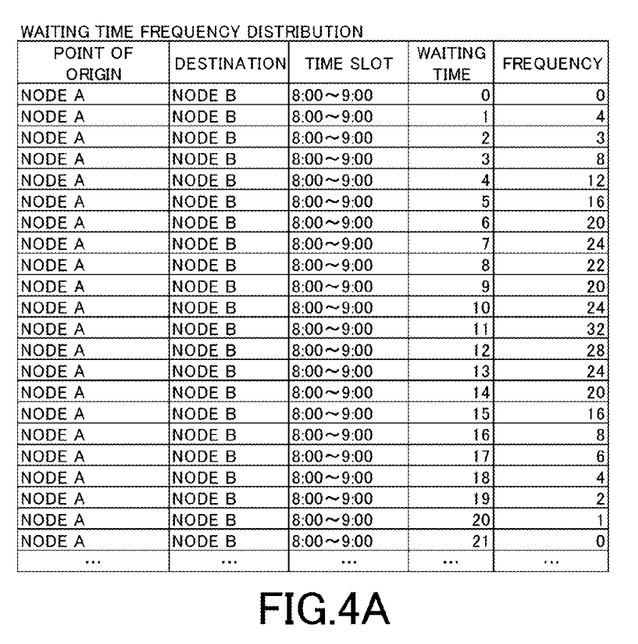
FIG. 4A and FIG. 4B are diagrams showing examples of a waiting time frequency distribution and a travel time frequency distribution in table format.
Figure 4B:
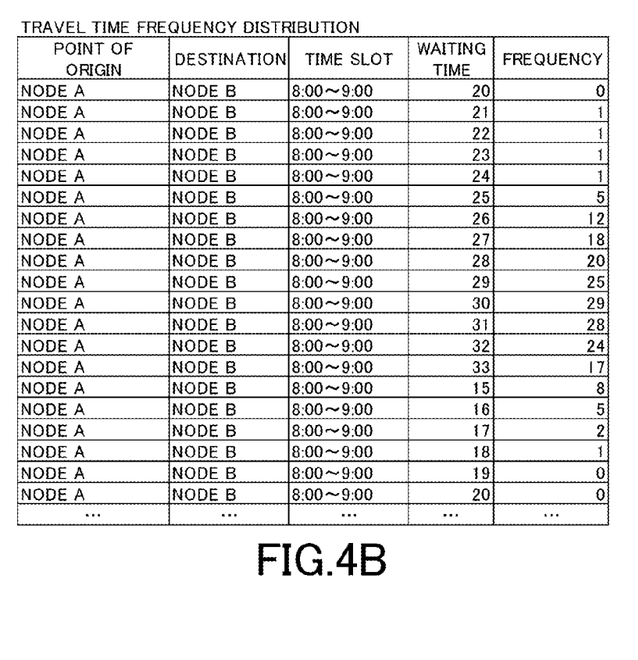

Data stored by the time information storage unit 14 may be in any format as long as probability distributions of a waiting time occurring at each node and a travel time occurring on each link can be obtained. FIG. 4A and FIG. 4B shows an example of data of "waiting times at nodes" and "travel times on links" expressed by frequency distributions (histograms). A probability can be obtained by dividing a sum of frequencies by a frequency of a target time. For example, in the example shown in FIG. 4A, since the sum of frequencies of waiting times is 294 and the frequency of a waiting time of 10 minutes is 24, a probability of the waiting time being 10 minutes can be calculated as 24/294=8.1%.

Moreover, while a waiting time and a travel time are expressed by frequency distributions in the present embodiment, types of functions representing probability distributions and parameters defining the distributions may be stored. For example, when a probability distribution of a travel time is a normal distribution, an average value and a standard deviation may be stored as parameters. In addition, when it is assumed that the number of trains arriving within a unit time conforms to a Poisson distribution, a frequency distribution of a waiting time may be expressed by an exponential distribution. As shown, a probability distribution may be stored as an arbitrary distribution function.

A travel time calculating unit 15 is a module which generates a probability distribution of a travel time. For each of a plurality of routes extracted by the route information searching unit 13, the travel time calculating unit 15 identifies a location where a waiting time occurs and locations where a travel time occurs on the route. A location where a waiting time occurs is a node at which a user must wait for a train or a bus to arrive among the nodes on the route. In addition, locations where a travel time occurs are all of the links on a route. Subsequently, a probability distribution of a total travel time is calculated by acquiring probability distributions of corresponding waiting times and travel times and performing convolution on all acquired probability distributions.

While the convolution method described above is for a case where probability distributions are given as functions, in the present embodiment, probability distributions are discrete probability distributions expressed by histograms. Therefore, the travel time calculating unit 15 performs convolution by obtaining a sum total of discrete values instead of by integrating functions. For example, when $f_A(t)$ and $g_{AB}(t)$ in Expression 1 are discrete probability distributions, a probability distribution of a total travel time can be represented by Expression 3.

[Math. 3]

$$h_1(t) = (f_A * g_{AB})(t) = \sum_{\tau_0} f_A(\tau_0) g_{AB}(t - \tau_0) \quad \text{(Expression 3)}$$

A route information providing unit 16 is a module which generates information to be presented to a user from the probability distribution of a total travel time calculated by the travel time calculating unit 15 and which presents the information to the user using output means (not shown). Since the calculated data is data which expresses a total travel time by a probability as shown in FIG. 2, the calculated data is not suitable to be presented to a user as-is. In consideration thereof, the route information providing unit 16 outputs the information by converting the information into a format that is readily understood by the user. The information presented to a user is referred to as travel time information.

<Method of Presenting Travel Time Information to User>

Figure 5A:
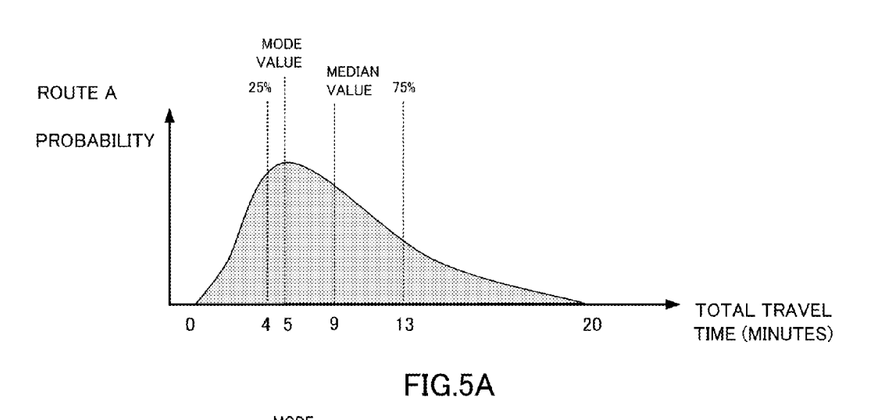
FIG. 5A and FIG. 5B are diagrams showing an example of a frequency distribution of a total travel time.
Figure 5B:
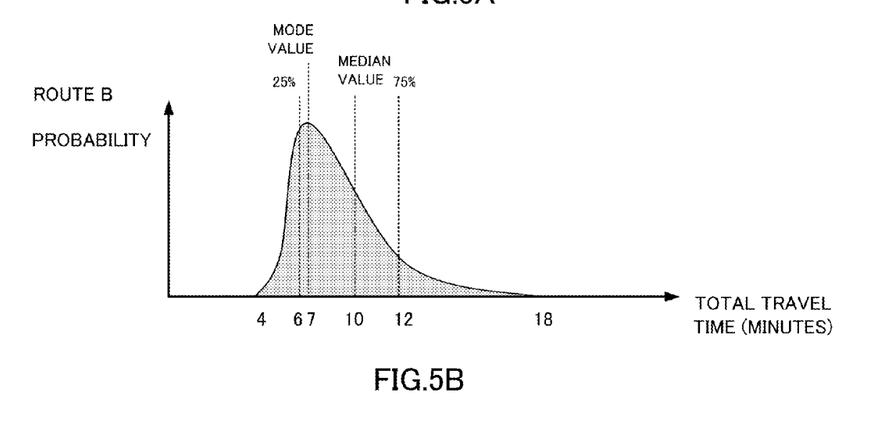

An example of generating travel time information to be presented to a user from a probability distribution of a total travel time will now be described. FIG. 5A and FIG. 5B shows an example of probability distributions of a total travel time respectively calculated when there are two routes connecting a point of origin and a destination.

When presenting a user with a specific value as an estimated travel time, a median value obtained from a probability distribution can be used. For example, in the case of route A, "9 minutes" can be outputted as an estimated travel time, and in the case of route B, "10 minutes" can be outputted as an estimated travel time. Moreover, an estimated travel time may be a value other than a median value. For example, a mode value, an average value, or other values obtained by computation may be used.

In addition, a range of travel times which enables arrival at the destination in time at a predetermined probability can be outputted in addition to a single estimated travel time. For example, when a time having a 50 percentile width centered on a median value is outputted as an estimated travel time, "4 to 13 minutes" can be outputted in the case of route A and "6 to 12 minutes" can be outputted in the case of route B. In this manner, a degree of variation in an estimated travel time can be presented to a user and the user can select a more suitable route from a plurality of routes. For example, a user can select route B with a smaller variation in travel times when the user wishes to reliably arrive by a desired time, or the user can select route A when the user wishes to use a route having a probability of arriving as early as possible.

Figure 6A:
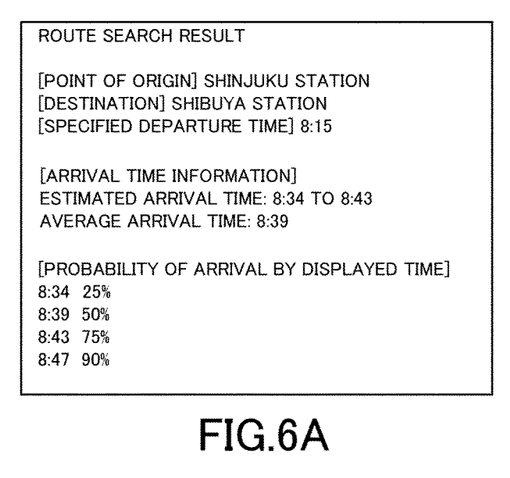
FIG. 6A and FIG. 6B are diagrams showing an example of a screen display of travel time information to be presented to a user.

FIG. 6A shows a display example of travel time information presented to a user. In this case, times between a 25 percentile value and a 75 percentile value are assumed to be an "estimated arrival time" range, and a median value of the range is assumed to be an "average arrival time". In addition, probabilities of arriving at the destination by displayed times are also displayed.

Figure 6B:
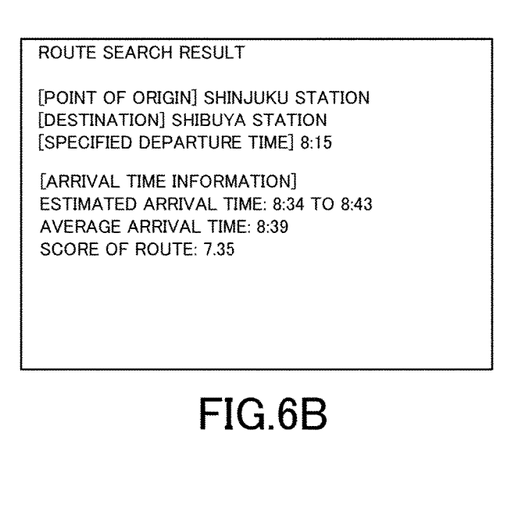

In addition, as shown in FIG. 6B, an evaluated score of the route may be displayed based on characteristics of the calculated probability distribution. For example, an evaluated score can be determined by an evaluation formula such as that represented by Expression 4. In Expression 4, $T_0$ denotes a median value, $T_1$ denotes a 25 percentile value, and $T_2$ denotes a 75 percentile value. In other words, the smaller the variation in arrival times and the earlier the arrival by a route, the higher the score of the route.

[Math. 4]

$$\frac{100}{p} = T_0 + \frac{T_2 - T_1}{2} + \frac{T_1}{10} \quad \text{(Expression 4)}$$

Moreover, the evaluation formula shown above is simply an example and an evaluated score may be computed using other elements or in combination with other elements. Examples of other elements which may be used to determine an evaluated score include the following.

(1) The lower the fare, the higher the evaluated score
(2) The smaller the number of transfers, the higher the evaluated score
(3) The smaller the median value or the mode value, the higher the evaluated score
(4) A standard deviation is obtained, whereby the smaller the value of the standard deviation, the higher the evaluated score In addition, when there are a plurality of routes, routes may be presented to the user in a descending order of evaluated scores.

<Processing Flow Chart>

Figure 7:
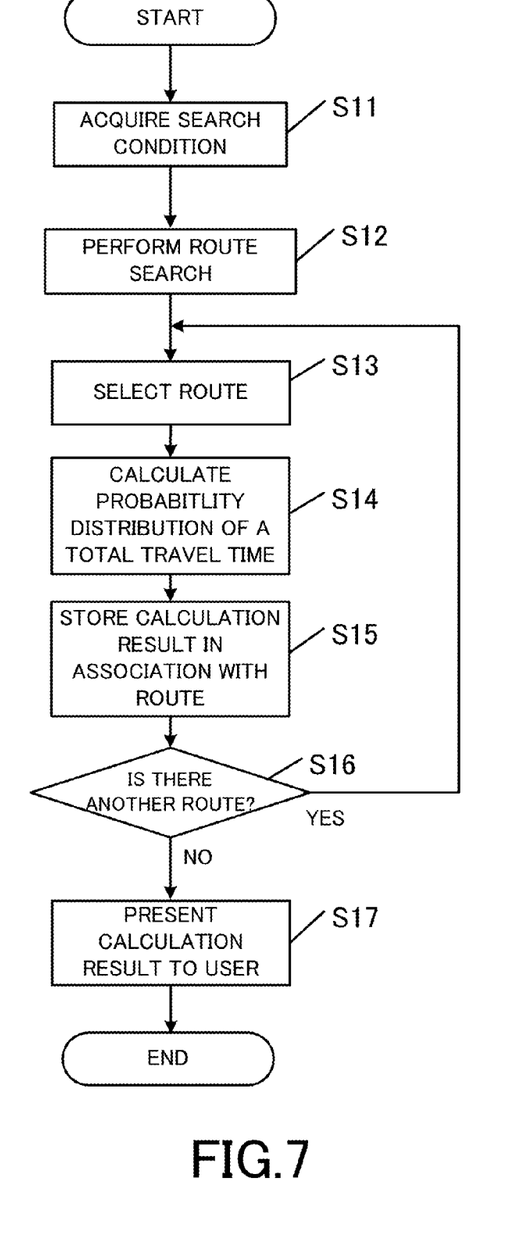
FIG. 7 is a processing flow chart of a route information providing apparatus according to an embodiment of the present invention.

Next, a method of calculating a travel time performed by the route information providing apparatus according to the present embodiment will be described in detail with reference to FIG. 7.

First, in step S11, the search condition acquiring unit 11 acquires a route searching condition from input/output means (not shown) and temporarily stores the route searching condition. While the inputted condition need only include a point of origin node and a destination node, the inputted condition may also include a desired departure time, a desired arrival time, specification of a prioritized route, specification of a via point, and the like. In the present example, it is assumed that the inputted condition includes a "point of origin node", a "destination node", and a "departure time slot".

In step S12, the route information searching unit 13 uses the transportation network information stored in the transportation network information storage unit 12 to search routes connecting the specified point of origin node and destination node, and acquires a plurality of route candidates. Known techniques can be used to search routes. The plurality of pieces of acquired route information (information on via nodes and links) are transmitted to the travel time calculating unit 15.

In step S13, the travel time calculating unit 15 selects one route from the plurality of pieces of acquired route information.

In addition, in step S14, the travel time calculating unit 15 extracts probability distribution data associated with a waiting time and a travel time which occur when traveling on the selected route from the time information storage unit 14. Furthermore, at this point, data is narrowed down according to a departure time slot (for example, 8:00 to 9:00) specified in the route searching condition. In addition, by performing a convolution integral on the extracted probability distribution data, a probability distribution of a total travel time is generated.

The generated probability distribution of a total travel time is associated with a route and temporarily stored by the travel time calculating unit 15 (S15).

In step S16, a check is performed by the travel time calculating unit 15 to see whether there is an unprocessed route other than the route selected in step S13, and if so, a return is made to step S13 to select the unprocessed route. By repeating this procedure, a probability distribution of a total travel time is calculated and stored for each route extracted in step S12.

In step S17, the route information providing unit 16 generates pieces of travel time information from the probability distributions of a total travel time and presents a piece of travel time information for each route to the user. The travel time information can be generated and displayed by the methods described earlier.

As described above, even in a case where a user travels using transportation means whose operation is not managed by a schedule, the route information providing apparatus according to the present embodiment can predict a travel time of the user with high accuracy and provide the user with the travel time. In addition, since an estimated travel time is provided to the user together with information indicating a degree of variation of a probability distribution, the user can determine a most appropriate route selection. Furthermore, by calculating an evaluation value, a route in accordance with preferences of the user can be recommended.

(Modifications)

The embodiment described above simply represents an example and various modifications may be made to the present invention without departing from the spirit and scope thereof.

For example, the exemplified route information providing apparatus is not limited to a computer and may instead be realized by a mobile information terminal such as a mobile phone or a smart phone. In addition, the search condition acquiring unit 11 and the route information providing unit 16 may be configured to be capable of communicating with a network and returning results in response to requests from a client connected to the network. Accordingly, service can be provided to remote terminals. Furthermore, the entire route information providing apparatus need not necessarily constitute a single apparatus and only a part of the units may be arranged on the network.

In addition, while the probability distribution of a waiting time exemplified in the embodiment is a probability distribution of a waiting time in a case where users arrive at a node at random times, when two or more transportation means are non-independently operated and have some kind of a dependency relationship, a probability distribution of a waiting time which takes the dependency relationship into consideration may be used.

The probability distribution of a waiting time in this case is a probability distribution of "a waiting time from the arrival of given transportation means at a node to the departure of transportation means that is a transfer destination from the node". As a result, for example, when an operation plan which takes transfers into consideration has been developed such as "when a train is expected to arrive at station A within a predetermined time, buses arriving at station A are to depart only after waiting for the train to arrive", a travel time can be more accurately calculated.

In addition, for specific nodes, a plurality of probability distributions of a waiting time can be defined to be used selectively. For example, different probability distributions may be used in a case where a user arrives at station A on foot and embarks on a train and in a case where a user transfers from one train to another at station A.

Furthermore, while probability distribution data is classified only according to departure time slots in the exemplified embodiment, probability distribution data may be further classified according to conditions such as day of week and weather, whereby probability distribution data matching a specified condition may be extracted and used in step S14. Accordingly, more accurate travel time information can be obtained.

In addition, while a state where public transportation means is not provided with an operation schedule is assumed in the exemplified embodiment, the present invention can also be applied to a case where an operation schedule is set.

While a waiting time from arriving at a node to embarking on a train is defined by a probability distribution in the exemplified embodiment, a probability distribution of a waiting time can be generated as long as there is data accumulating actual departure times with respect to scheduled departure times.

Figure 8A:
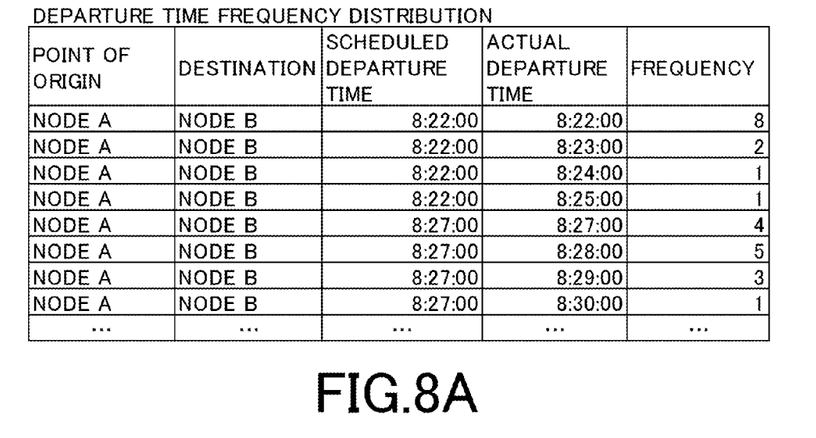
FIG. 8A and FIG. 8B are diagrams showing an example of a waiting time frequency distribution according to a modification.
Figure 8B:
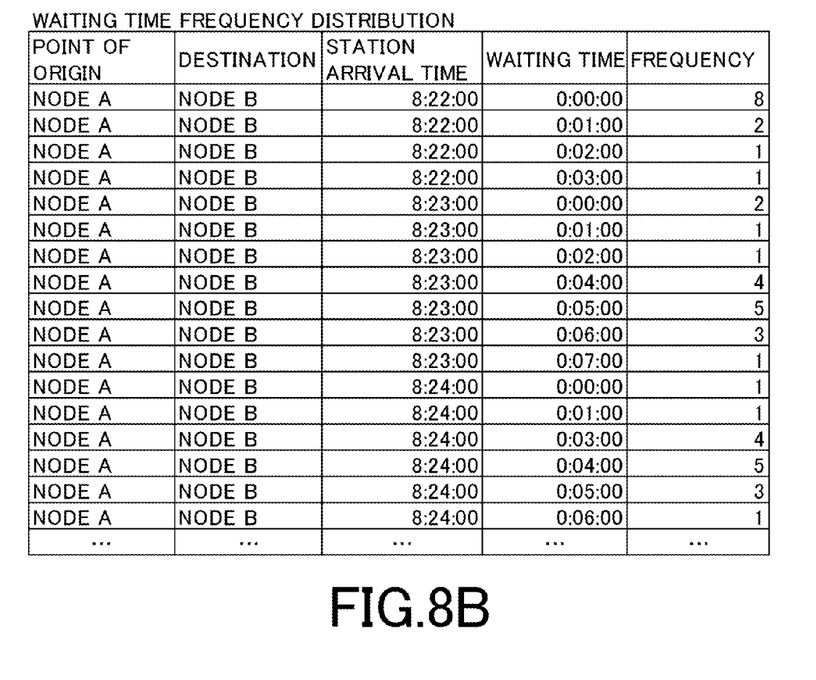

For example, when assumption is made that departure times on an operation schedule are 8:22 and 8:27 and a frequency distribution of actual departure times is stored in a format shown in FIG. 8A, by deforming the data, a frequency distribution of a waiting time for each station arrival time can be generated as shown in FIG. 8B. When an operation schedule is set, a frequency distribution of a waiting time can be indirectly stored using such a method.

Furthermore, while a median value, a mode value, a 25 percentile value, and a 75 percentile value have been used to generate travel time information in the exemplified embodiment, it is obvious that other values can be used. In addition, when traveling by a combination of transportation means without an operation schedule and transportation means with an operation schedule or when a link with a definitive travel time such as in the case of traveling on foot is included, a total travel time can be calculated by adding up all computed times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284592, filed on Dec. 27, 2012, which is hereby incorporated by reference herein in its entirety.

REFERENCE SIGNS LIST

10: Route information providing apparatus
11: Search condition acquiring unit
12: Transportation network information storage unit
13: Route information searching unit
14: Time information storage unit
15: Travel time calculating unit
16: Route information providing unit

The invention claimed is:

1. A travel time information providing apparatus that provides a user with information regarding a travel time in a transportation network which is constituted by nodes and links and in which travel by train or bus is enabled, the travel time information providing apparatus comprising:

a memory configured as a probability distribution storage unit configured to store first probability distribution data which expresses an embarkation waiting time that is a time from when a user arrives at any of the nodes constituting the transportation network until when the user embarks on a train or bus to depart from the node for each location where the waiting time occurs and second probability distribution data which expresses a travel time that is a time necessary for the user to travel in any of the links constituting the transportation network for each location where the travel time occurs;

a processor configured to act as:

a route acquiring unit configured to search for a route connecting a point of origin and a destination and acquire a plurality of route candidates;

a travel time calculating unit configured to calculate a probability distribution of a total travel time by acquiring all first probability distribution data corresponding to an embarkation waiting time which occurs on the route and second probability distribution data corresponding to a travel time which occurs on the route, and convoluting the acquired probability distribution data, for each of the route candidates; and an information providing unit configured to determine an estimated travel time and an evaluation value corresponding to each of the route candidates, based on the calculated probability distribution of the total travel time, and output the estimated travel time and the evaluation value in a descending order of the evaluation values on the routes, wherein the evaluation value is higher as a median value or a mode value of the probability distribution of the total travel time is smaller, the evaluation value is higher as a variation of the probability distribution of the total travel time is smaller, the evaluation value is higher as a fare is cheaper, and
the evaluation value is higher as a number of transfers is smaller.

2. The travel time information providing apparatus according to claim 1, wherein
the information providing unit outputs a probability of arriving at the destination within the estimated travel time together with the estimated travel time.

3. The travel time information providing apparatus according to claim 1, wherein
the information providing unit extracts a median value or a mode value from the probability distribution of the total travel time and outputs the median value or the mode value as an estimated travel time.

4. The travel time information providing apparatus according to claim 1, wherein
a probability distribution of an embarkation waiting time at each node, which is stored by the probability distribution storage unit, is a probability distribution of a time from when a user arrives at the node at a random time until when the user departs from the node.

5. The travel time information providing apparatus according to claim 1, wherein
a probability distribution of an embarkation waiting time at each node, which is stored by the probability distribution storage unit, is a probability distribution of time from when a user arrives at the node by train or bus until when the user departs from the node.

6. A travel time information providing method performed by a travel time information providing apparatus that provides a user with information regarding a travel time in a transportation network which is constituted by nodes and links and in which travel by train or bus is enabled, the travel time information providing method comprising:

a step of searching for a route connecting a point of origin and a destination and acquiring a plurality of route candidates;

a step of acquiring in a probability distribution format all embarkation waiting times that are times which occur at a node on the route from when a user arrives at the node until when the user embarks on a train or bus and departs from the node;

a step of acquiring in a probability distribution format all travel times that are times which occur on a link on the route and which are necessary for a user to travel in the link;

a step of calculating a probability distribution of a total travel time by convoluting the plurality of acquired probability distributions, for each of the route candidates; and a step of determining an estimated travel time for each of the route candidates based on the calculated probability distribution of the total travel time and outputting the estimated travel time and the evaluation value in a descending order of the evaluation values on the routes, wherein the evaluation value is higher as a median value or a mode value of the probability distribution of the total travel time is smaller, the evaluation value is higher as a variation of the probability distribution of the total travel time is smaller, the evaluation value is higher as a fare is cheaper, and the evaluation value is higher as number of transfers is smaller.

* * * * *